United States Patent
Goerger (10) Patent No.: US 10,766,817 B2
(45) Date of Patent: Sep. 8, 2020

(54) CHEMICAL SUBSTITUTIONS FOR PORTLAND CEMENT MIXTURES AND APPLICATIONS THEREFOR

(71) Applicant: Bryan Goerger, Minneapolis, MN (US)

(72) Inventor: Bryan Goerger, Minneapolis, MN (US)

(73) Assignee: Surface Tech LLC., La Jolla, CA (US)

( * ) Notice: Subject to any disclaimer, the term of this patent is extended or adjusted under 35 U.S.C. 154(b) by 369 days.

(21) Appl. No.: 15/888,017

(22) Filed: Feb. 3, 2018

(65) Prior Publication Data

US 2019/0241473 A1 Aug. 8, 2019

(51) Int. Cl.

| | |
|---|---|
| *C04B 28/04* | (2006.01) |
| *C04B 14/06* | (2006.01) |
| *C04B 18/08* | (2006.01) |
| *C09K 17/10* | (2006.01) |
| *C04B 14/38* | (2006.01) |
| *C04B 111/00* | (2006.01) |
| *C04B 40/00* | (2006.01) |

(52) U.S. Cl.
CPC .............. *C04B 28/04* (2013.01); *C04B 14/06* (2013.01); *C04B 14/38* (2013.01); *C04B 18/08* (2013.01); *C09K 17/10* (2013.01); *C04B 40/0042* (2013.01); *C04B 2111/00741* (2013.01)

(58) Field of Classification Search
CPC ......... C04B 14/06; C04B 14/38; C04B 18/08; C04B 28/04; C04B 40/0042; C04B 2111/00741; C09K 17/10
See application file for complete search history.

(56) References Cited

U.S. PATENT DOCUMENTS

| | | | |
|---|---|---|---|
| 3,335,018 A | 8/1967 | Peeler | |
| 9,290,939 B2 * | 3/2016 | Ciuperca | ................. E04C 2/296 |
| 9,505,657 B2 * | 11/2016 | Ciuperca | ................. C04B 28/04 |
| 2012/0234208 A1 | 9/2012 | McPherson | |
| 2014/0033638 A1 | 2/2014 | Goerger | |
| 2014/0060389 A1 | 3/2014 | Halliburton | |

* cited by examiner

*Primary Examiner* — Anthony J Green
(74) *Attorney, Agent, or Firm* — Mersenne Law (57) ABSTRACT

Embodiments of the invention enhance the performance of concrete mixtures, and have the flexibility to be used in both a variety of traditional poured concretes, as well as in sprayed concrete applications and geotechnical solutions which is commonly considered a cement application. It is an aspect of the present invention to provide a cementitious material comprising fly ash, wollastonite and nepheline syenite which is flexible enough in nature and chemistry to be used in a variety of concrete application which are poured and sprayed, as well as in blended into and within traditional cement applications. The use of a graduated blend of mineral fibers and industrial minerals also provide marked benefits to reduce both project cost and environmental impact.

15 Claims, 4 Drawing Sheets

CHEMICAL SUBSTITUTIONS FOR PORTLAND CEMENT MIXTURES AND APPLICATIONS THEREFOR

CONTINUITY AND CLAIM OF PRIORITY

This is an original U.S. patent application.

FIELD

The present invention relates to cementitious materials, and more particularly relates to the use of mixtures of nepheline syenite, fly ash, metakaolin and/or ground glass with selected grades of wollastonite for cements for use in concrete and the like.

BACKGROUND

Portland cements are hydraulic cements that chemically react and harden with the addition of water. Portland cement contains limestone, clay, cement rock and iron ore blended and heated to a temperature of about 2,600-3,000° F. The resulting product is subsequently ground to a powder consistency and mixed with gypsum to control setting time. Portland cement is used in many architectural, masonry and construction applications, most notably as concrete for roads, runways, slabs, floors, walls, precast structures and the like.

Architectural and construction applications such as roads, bridges, commercial and residential buildings and waterway systems that require a significant amount of cement-based concrete would benefit from a lower cost cementitious material that reduces or eliminates the dependency on the availability of limestone, clay, cement rock and iron ore. For example, U.S. Pat. No. 5,820,668, which is incorporated herein by reference, discloses inorganic binder compositions that may be used as partial substitutes or total replacements for Portland cement for such applications. The inorganic binder compositions include materials such as fly ash, $Al_2O_3$, pozzolan, nepheline syenite, aluminum silicate, sodium hydroxide, silicic acid, potassium salt and sodium salt.

Architectural and construction applications that are subjected to increased fatigue stresses, acid rain and/or road salt, such as roads, bridges, transportation facilities and high-rise applications, would further benefit from a cementitious material having improved durability, acid resistance and improved rapid chloride ion penetrability. With the growing popularity of cement-alternative compositions and the desire to re-use manufacturing by-products such as stainless steel slag, a cementitious material that incorporates a manufacturing by-product material and exhibits improved properties is highly desirable. Accordingly, a need remains for a cost effective environmentally friendly cementitious material that incorporates stainless steel slag and exhibits improved durability, sulfate resistance and improved chloride ion resistance.

In view of the foregoing, embodiments of the invention are anticipated to be of significant value in the field.

SUMMARY

The present invention is directed to a cementitious material including fly ash, wollastonite and nepheline syenite, that can be added to conventional hydraulic cement compositions, such as Portland cement, as a partial or total replacement for conventional cement materials.

It is an aspect of the present invention to provide a cementitious material comprising fly ash, wollastonite and nepheline syenite which is flexible enough in nature and chemistry to be used in a variety of concrete application which are poured and sprayed, as well as in blended into and within traditional cement applications. The use of a graduated blend of mineral fibers and industrial minerals also provide marked benefits to reduce both project cost and environmental impact.

These and other aspects of the present invention will be more apparent from the following description.

DETAILED DESCRIPTION

As high quality fly ash resources become less commonly available, prices of this highly-sought after pozzolan source have risen steadily. Other low quality, affordable sources of pozzolan exist, yet require activation from select grades of wollastonite to produce a gradient of concretes with unexpected structural performance. Yet historically, the performance of a single alternative binder technology has not shown the flexibility to be used in both a variety of traditional poured concretes, as well as in sprayed concrete applications and geotechnical solutions which is commonly considered a cement application.

Embodiments of the invention use wollastonite, a naturally occurring, calcium metasilicate ($CaSiO_3$), white, non-metallic mineral with an acicular particle shape. Wollastonite's unique chemistry and acicular (needle-shaped) physical structure make it one of the world's most versatile and effective value-added performance materials. The mineral is commercially available in a number of different configurations, distinguished by particle size, shape and aspect ratio. Embodiments of the invention typically use two or more different configurations, such as those known by the common commercial names HAARP-20, HAARP-40 and HAARP-20×40.

Embodiments also use pozzolans, a broad class of siliceous or siliceous and aluminous materials which, in themselves, possess little or no cementitious value but which will, in finely divided form and in the presence of water, react chemically with calcium hydroxide at ordinary temperature to form compounds possessing cementitious properties. The quantification of the capacity of a pozzolan to react with calcium hydroxide and water is given by measuring its pozzolanic activity. Pozzolana are naturally occurring pozzolans of volcanic origin.

Nepheline syenites are silica-undersaturated and some are peralkaline. Nepheline is a feldspathoid, a solid-solution mineral, that does not coexist with quartz; rather, nepheline would react with quartz to produce alkali feldspar. They are distinguished from ordinary basic syenites not only by the presence of nepheline but also by the occurrence of many other minerals rich in alkalis and in rare earths and other incompatible elements Alkali feldspar dominates, commonly represented by orthoclase and the exsolved lamellar albite, form perthite. In some rocks the potash feldspar, in others the soda feldspar predominates. Fresh clear microcline is very characteristic of some types of nepheline syenite.

Another component of an embodiment, fly ash, is a coal combustion product that is composed of the particulates that are driven out of coal-fired boilers together with the flue gases. Fly ash is generally captured by electrostatic precipitators or other particle filtration equipment in coal-fired plants before the flue gases reach the chimneys. Together with bottom ash (ash that falls to the bottom of the combustion chamber, rather than traveling up with the flue gases), fly ash includes substantial amounts of silicon dioxide ($SiO_2$) (both amorphous and crystalline), aluminium oxide ($Al_2O_3$) and calcium oxide (CaO).

The present invention relates to a method of developing a concrete matrix that will meet or exceed common industry (ACI, ASTM, and the like) standards related to compressive and axial performance created by this method. The mix for concrete applications may contain between 40 and 50% stone, between 30 and 40% sand, between 10 and 15% Portland cement, between 5 and 10% fly ash, between 0.5 and 2% mineral fibers, and between 0.005 and 5% admixtures by weight. More specifically, the mix may contain between 45 and 50% stone, between 30 and 35% sand, between 10 and 12% Portland cement, between 5 and 8% fly ash, between 1 and 2% mineral fibers, and between 0 and 1% admixtures by weight. In one specific example, the mix may contain approximately 48.24% stone, 33.15% sand, 10.32% Portland cement, 6.88% fly ash, 1.41% mineral fibers, and preferably less than 0.005% of admixtures by weight. The mix may contain mineral fibers of different grades and/or dimensions.

Example 1

An exemplary embodiment offering 8,700 psi strength characteristics may be prepared using the following recipe:

| Ingredient | Basis (per yard$^3$) | |
| --- | --- | --- |
| Cement | 366 | lbs |
| Fly ash | 244 | lbs |
| Fine Aggregates | 1175 | lbs |
| Coarse Aggregates . . . ⅜" | 1710 | lbs |
| Air-Entrainment | 3.5 | oz |
| Water Reducer | 33.5 | oz |
| Accelerators | 43.9 | oz |
| Fibers | 2.00 | lbs |
| Water | 266 | lbs |

Example 2

Another useful way to characterize a Portland cement concrete mixture is in terms of ingredient percentages by weight. An embodiment may be blended as:

| Ingredient | Percentage (by weight) | |
| --- | --- | --- |
| Stone (gravel, aggregate) | 40-50% | |
| Sand | 30-40% | |
| Portland cement | 10-15% | |
| Fly Ash | 5-10% | |
| Wollastonite | 1-7.5% | (subcomponent of fly-ash fraction) |
| Mineral Fiber | 0.5-2% | |

Another suitable mixture is:

| Ingredient | Percentage (by weight) | |
| --- | --- | --- |
| Stone (gravel, aggregate) | 45-50% | |
| Sand | 30-35% | |
| Portland cement | 10-12% | |
| Fly Ash | 5-8% | |
| Wollastonite | 1-5% | (subcomponent of fly-ash fraction) |
| Mineral Fiber | 1-2% | |

For an application such as a semiconductor fabrication facility, a particularly favorable mixture is:

| Ingredient | Percentage (by weight) | |
| --- | --- | --- |
| Stone (gravel, aggregate) | 48.24% | |
| Sand | 33.15% | |
| Portland cement | 10.32% | |
| Fly Ash | 6.88% | |
| Wollastonite | 1.46% | (subcomponent of fly-ash fraction) |
| Mineral Fiber | 1.41% | |
| Total | 100.00% | |

Particular Characteristics of Embodiments

Embodiments comprise a plurality of different grades of wollastonite, which are blended together to form a gradated micro-reinforcement matrix. Specifically, multiple wollastonite grades, with particle size varying from a very fine powder to grades with high aspect ratio particles (i.e., oblong or rod-shaped particles, e.g., the size and shape of very small kernels of rice).

At a microscopic level, and without being bound to theory, the finest powders are believed to act much like hook-and-loop (Velcro®) fasteners within the finished concrete. At a microscopic level, cement particles are angular in nature and pozzolans are more spherical. The fine grades of wollastonite that are used in embodiments are long, slender and more barb-like in nature. The fine barbs unite the angular particles of cement and spherical pozzolans in a more efficient manner than cement and pozzolans alone. Anecdotally, the goal of preventing concrete cracks has been likened to killing a monster: it is easier to do when the monster (crack) is small. Separately, yet related to micro reinforcement with wollastonite, it is believed that a supplemental chemical reaction takes place during concrete curing, resulting in an additional chemical fusion, which enhances the mechanical binding discussed earlier.

In the event that the finished concrete experiences pressure greater than the micro-reinforcement can withstand, a larger grade of wollastonite forms a second line of defense against cracking. In some embodiments, three or more different grades of wollastonite may be blended in.

Another way of thinking about mixture design for a Portland cement concrete implementing an embodiment is that the mixture comprises one or more grades of powder-like wollastonite particles, where the particles' aspect ratio is near unity, notwithstanding that the absolute sizes of particles in each grade may vary. These powder-like particles may not, strictly speaking, be spherical, but they are not significantly larger or longer in one direction than in another direction.

In addition to the one or more grades of powder-like wollastonite particles, an embodiment also comprises one or more grades of anisotropic-sized wollastonite particles—particles with an aspect ratio different from unity, which are thus short and fat or thin and wide. The anisotropic wollastonite particles (which may include small, odd-shaped particles; medium, odd-shaped particles; and large, odd-shaped particles) contribute to the second line of defense against cracking. These particles are more barb-like in configuration, yet undergo a similar chemical reaction with the other materials in the concrete. However, these particles are typically larger—easily visible with the naked eye. It is believed that barbs extending from these thicker kernels interconnect with similar barbs from the powder-type wollastonite particles to form a mechanical connection or matrix that strengthens the concrete. The larger particles also have an inherent physical strength that increases the amount of energy (i.e., pressure) required to nucleate cracks within the concrete.

Finally, in an embodiment, the strength added by the at least one grade of powder-type wollastonite particles and the at least one grade of anisotropic wollastonite particles, can be supplemented by adding fibers, such as plastic, steel or aramid fibers. Again, a range of fiber types, lengths and diameters may be used to fine-tune cement characteristics. For example, aramid micro-fibers may be combined with mid-grade synthetic fibers and longer structural fibers. These may all be added and blended with the dry ingredients, or mixed into the wet cement during the penultimate manufacturing stage (prior to placing the cement in forms for curing).

It is appreciated that the multiple grades of powder-type wollastonite and anisotropic wollastonite provide flexibility in achieving a desired strength of the finished cement concrete. For example, two or three grades of wollastonite may substitute for some quantity or quality of reinforcing fibers that would otherwise be necessary to meet strength targets. Since the cost and availability of wollastonite is often different from that of functionally-comparable amounts of reinforcing fiber, this flexibility can allow mix designers to make a less-expensive blend which has equivalent strength. As disclosed above in the specific example recipes, the wollastonite fraction may be considered part of the fly ash component of a mixture. Suitable ranges are between about 1% and about 7.5% by weight (of the entire mixture), with ranges between 1% and 5% being particularly favored. Adding more wollastonite (above about 7.5% by weight) does not yield significant additional benefits, and may actually reduce some performance characteristics of the cement. Above about 20% by weight, it is generally economically unfavorable (as well as unfavorable from a performance standpoint).

Applicants have successfully used "HAARP-40" and "HAARP-20×40" brand wollastonite blends from S&B Group. HAARP-40 comprises a range of mesh sizes:

| Property | Value |
| --- | --- |
| Minus 20 U.S. Mesh (851 Microns) Screen (%) | 100 |
| Minus 40 U.S. Mesh (400 Microns) Screen (%) | 97 |
| Minus 60 U.S. Mesh (250 Microns) Screen (%) | 79 |
| Minus 100 U.S. Mesh (149 Microns) Screen (%) | 57 |

HAARP-20×40 (anisotropic) comprises:

| Property | Value |
| --- | --- |
| Minus 10 U.S. Mesh (2000 Microns) Screen (%) | 100 |
| Minus 20 U.S. Mesh (841 Microns) Screen (%) | 87 |
| Minus 40 U.S. Mesh (400 Microns) Screen (%) | 26 |
| Minus 60 U.S. Mesh (250 Microns) Screen (%) | 3 |
| Minus 100 U.S. Mesh (149 Microns) Screen (%) | 2 |

Note that there is a substantial decline in proportion by mesh size between 20-mesh and 40-mesh (87% of the anisotropic particles fit through a 20-mesh screen, but only 26% fit through a 40-mesh screen). Furthermore, there are very few extremely-small particles (less than 5% at 60-mesh).

Application Notes

Cement mixtures according to an embodiment of the invention are useful in a variety of applications. In addition, with supplemental ingredients and/or processing techniques, they may be used in other applications.

Soil Stabilization

Figure 2:
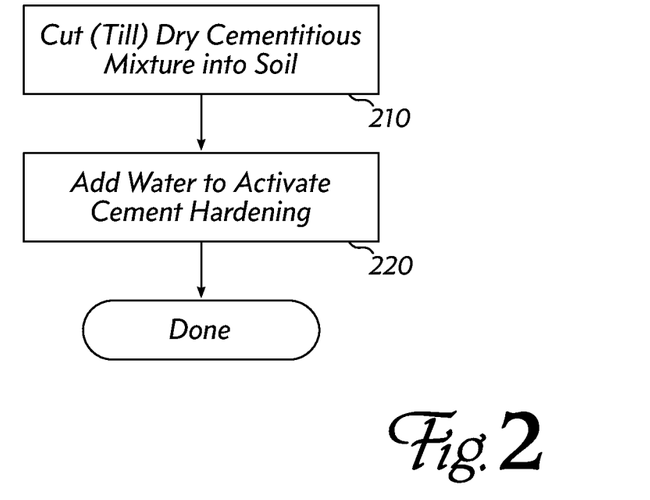
FIG. 2 outlines a method of stabilizing soil using an embodiment of the invention.

As shown in FIG. 2, a dry cementitious mixture according to an embodiment may be cut (i.e., tilled, plowed) into the soil at a site (210) at a rate of around 60-70% treated soil to 30-40% cement. Moisture (e.g. water) may be added if necessary (220) to achieve a minimum strength of 1500 psi. The moisture activates the cement's chemical reaction and causes the mixture to hold the soil together. Soil thus treated is not as strong as solid cement, but it is significantly more resistant to erosion than untreated soil.

In one preferred embodiment, the mix design contains approximately 60% site soil, and 40% Portland cement by weight. However, a mix according to the present invention may contain between 65% site soil, with a preferred range being between 60 and 70% soil. A mix according to the present invention may also contain between 65-75% soil. A mix according to the present invention may also contain between 25 and 35% Portland cement, with a preferred range being between 25 and 27% Portland cement. A mix according to the present invention may also contain between 2 and 5% bentonite, with a preferred range being between 2 and 4% bentonite. A mix according to the present invention may also contain between 0.5 and 10% minerals, with a preferred range being between 0.5 and 2% minerals. A mix according to the present invention may also contain between 0 and 10% admixtures, with a preferred range being between 0.005 and 5% admixtures. Thus, a preferred mix may contain between 65 and 75% site soil, between 25 and 35% Portland cement, between 2 and 5% bentonite, between 0.5 and 2% minerals, and between 0.005 and 5% admixtures. The lower end of the range represents the most commonly used percentage of the material and the upper bound is a measure that was determined, through our lab testing, to be unsuitable for this given application. An alternative mix may contain between 68 and 70% site soil, between 10 and 12% Portland cement, between 2 and 3% fly ash, between 1 and 2% minerals, and between 0 and 1% admixtures.

Spray Applications

Figure 3:
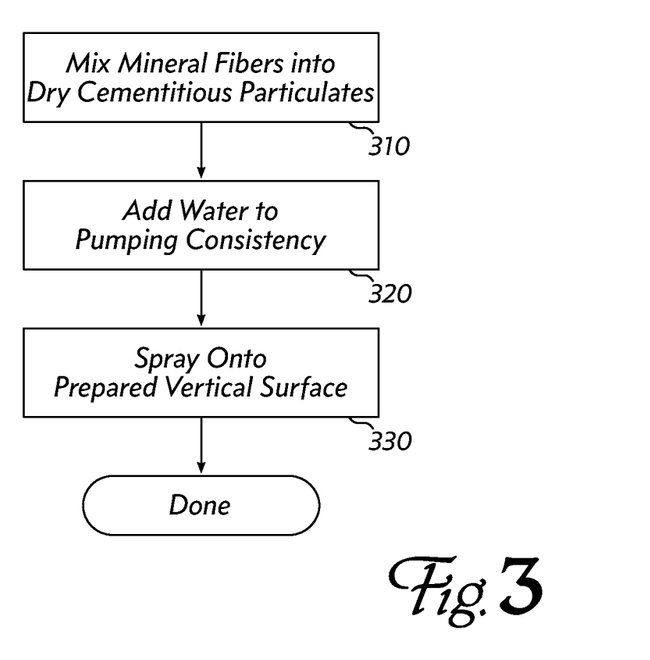
FIG. 3 outlines a method of applying Portland cement concrete through a spray process according to an embodiment of the invention.
Figure 4:
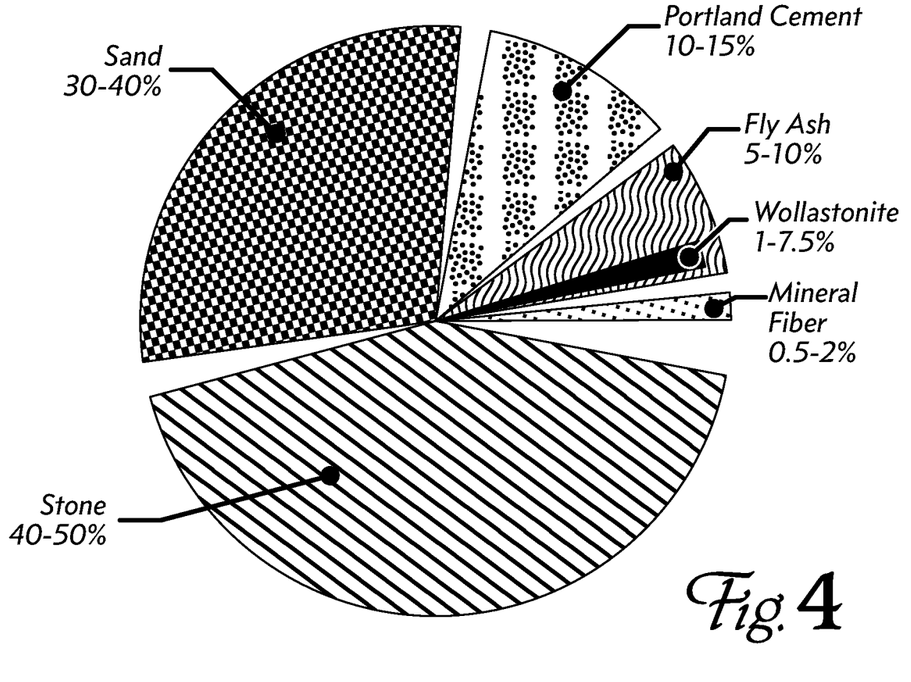
FIG. 4 shows approximate ingredient proportions of a typical Portland cement concrete mixture according to an embodiment of the invention.
Figure 5:
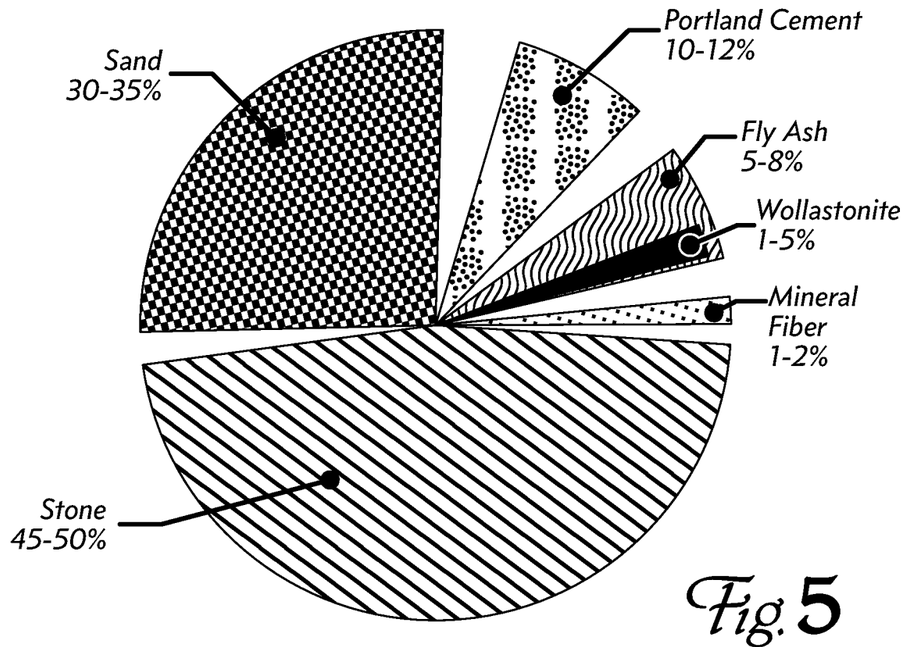
FIG. 5 shows approximate ingredient proportions of another possible Portland cement concrete mixture according to an embodiment of the invention.
Figure 6:
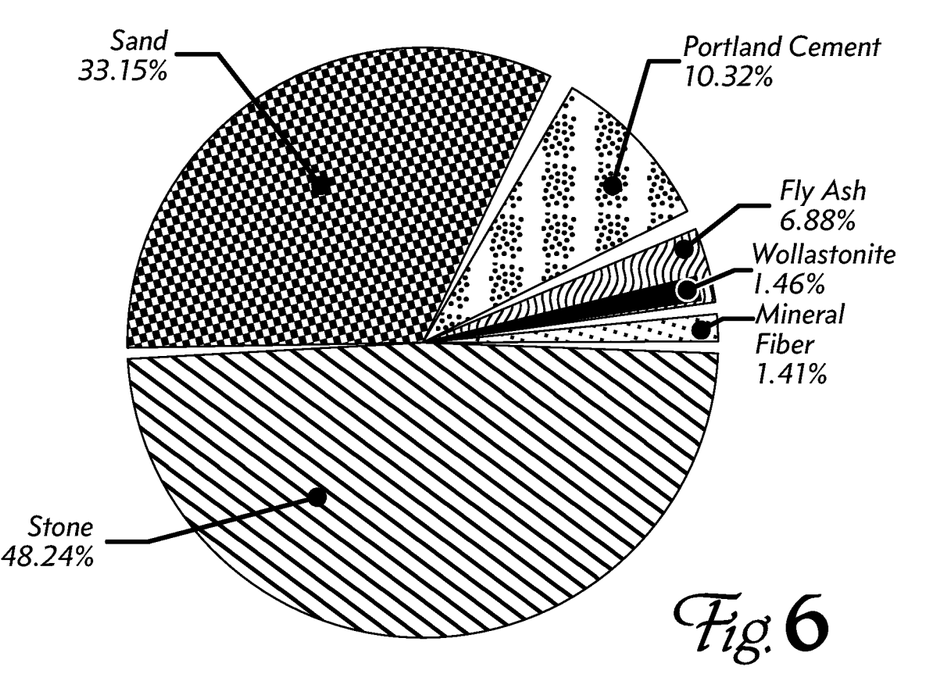
FIG. 6 shows ingredient proportions of a particular favorable mixture of Portland cement concrete according to an embodiment of the invention.

FIG. 3 outlines another application of a Portland cement concrete mixture according to an embodiment. Fibers, such as polyester, nylon, PET or aramid fibers, may be added to a cementitious mixture (310), either before or during final mixing with water (320) to create a slurry having substantial adhesive and anti-slump properties. As a result, this slurry can be sprayed on prepared vertical surfaces (330), where it resists running and sagging long enough to harden in place. Such sprayed coatings may provide adequate strength without requiring the construction (and later removal) of plywood forms.

In one preferred embodiment, the mix design contains approximately 25.63% stone, or aggregate, 52.06% sand, 18.33% Portland cement, 2.26% fly ash, 1.41% minerals, and preferably less than 0.005% of admixtures by weight. However, a mix according to the present invention may contain between 20 and 40% stone, with a preferred range being between 20 and 30% stone. A mix according to the present invention may also contain between 40 and 60% sand, with a preferred range being between 50 and 60% sand. A mix according to the present invention may also contain between 2 and 8% Portland cement, with a preferred range being between 15 and 20% Portland cement. A mix according to the present invention may also contain between 2 and 8% fly ash, with a preferred range being between 2 and 5% fly ash. A mix according to the present invention may also contain between 0.5 and 10% minerals, with a preferred range being between 0.5 and 2% minerals. A mix according to the present invention may also contain between 0 and 10% admixtures, with a preferred range being between 0.005 and 5% admixtures. Thus, a preferred mix may contain between 20 and 30% stone, between 50 and 60% sand, between 15 and 20% Portland cement, between 2 and 8% fly ash, between 0.5 and 2% minerals, and between 0.005 and 5% admixtures. The lower end of the range represents the most commonly used percentage of the material and the upper bound is a measure that was determined, through our lab testing, to be unsuitable for this given application. An alternative mix may contain between 25 and 40% stone, between 55 and 60% sand, between 18 and 20% Portland cement, between 5 and 8% fly ash, between 1 and 2% minerals, and between 0 and 1% admixtures.

Traditional Cast Forms

Figure 1:
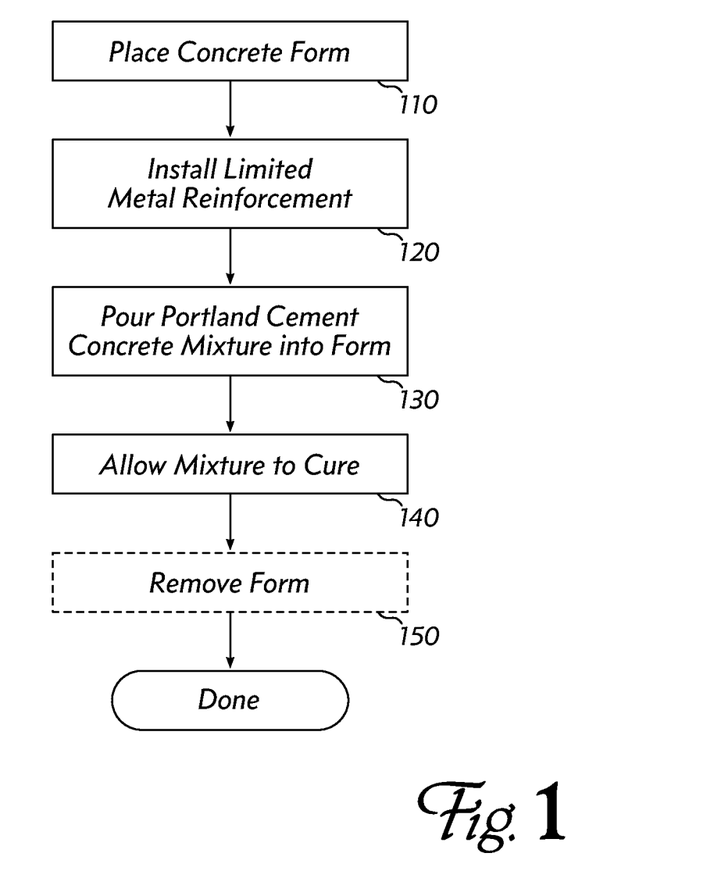
FIG. 1 outlines a method of constructing a reinforced Portland cement concrete structure using an embodiment of the invention.

Compositions according to an embodiment also bestow the advantages of lower cost, re-use of traditional waste and reduced carbon-dioxide emission to traditional cast-in-place concrete applications. FIG. 1 outlines the use of a Portland cement concrete mixture according to an embodiment in a traditional casting process. A form may be prepared with outer surfaces bounded by sturdy, planar members (e.g., plywood sheets) (110). The interior volume may contain reinforcing material, such as steel bars or mesh (120). The cementitious mixture of an embodiment is mixed with water and then poured, pumped or sprayed into the prepared form (130). Vibration may be employed to help distribute the cement. Then, following an adequate curing time (140), the form surfaces may be removed to yield the finished concrete structure (150).

Beneficially, when using a mixture according to an embodiment in this application, a reduced amount of reinforcing material (metal—steel bars or mesh) may be used because more of the design load can be borne by the cement concrete. Thus, for example, the process may involve installing metal reinforcement that—alone or with prior-art Portland cement concrete—would be inadequate to support the design load at step 120. Because of the increased strength of the claimed concrete mixture, the cast form (with its traditionally-inadequate reinforcement strength) will nevertheless meet or exceed design requirements. Furthermore, the combination will be economically favorable, in that the finished structure will cost less than traditional weaker cement with stronger reinforcement.

The specific mixtures, recipes, ingredient ranges and applications of the present invention have been described largely by reference to specific examples and in terms of particular allocations of functionality to certain ingredients or ingredient classes. However, those of skill in the art will recognize that mix design for alternative cement pastes can also be produced by mixtures that vary somewhat from the samples described. Such variations and implementations are understood to be captured according to the following claims.

In one preferred embodiment, the mix design contains approximately 48.24% stone or aggregate, 33.15% sand, 10.32% Portland cement, 6.88% fly ash of which 1.46% is multiple grades of wollastonite, 1.41% mineral fibers, and preferably less than 0.005% of admixtures by weight. However, a mix according to the present invention may contain between 30 and 50% stone, with a preferred range being between 40 and 50% stone. A mix according to the present invention may also contain between 30 and 50% sand, with a preferred range being between 30 and 40% sand. A mix according to the present invention may also contain between 5 and 20% Portland cement, with a preferred range being between 10 and 15% Portland cement. A mix according to the present invention may also contain between 2 and 15% fly ash, with a preferred range being between 5 and 10% fly ash. Again, the fly ash component should include about 1-7.5% by weight of multiple grades of wollastonite. A mix according to the present invention may also contain between 0.5 and 10% minerals, with a preferred range being between 0.5 and 2% minerals. A mix according to the present invention may also contain between 0 and 10% admixtures, with a preferred range being between 0.005 and 5% admixtures. Thus, a preferred mix may contain between 40 and 50% stone, between 30 and 40% sand, between 10 and 15% Portland cement, between 5 and 10% fly ash, between 0.5 and 2% minerals, and between 0.005 and 5% admixtures. The lower end of the range represents the most commonly used percentage of the material and the upper bound is a measure that was determined, through our lab testing, to be unsuitable for this given application. An alternative mix may contain between 45 and 50% stone, between 30 and 35% sand, between 10 and 12% Portland cement, between 5 and 8% fly ash, between 1 and 2% minerals, and between 0 and 1% admixtures. Additional specific mixtures are shown below, along with the relative strength of a given cured wall for each mixture.

An embodiment may be a dry cementitious mixture comprising stone, sand, Portland cement, fly ash and mineral fibers mixed together to produce a dry cementitious mixture having roughly uniform ingredient distribution and a total weight, wherein a weight of the stone is between 40 and 50% of the total weight; a weight of the sand is between 30 and 40% of the total weight; a weight of the Portland cement is between 10 and 15% of the total weight; a weight of the fly ash is between 5 and 10% of the total weight; and a weight of the mineral fibers is between 0.5 and 2% of the total weight, the mixture further comprising: wollastonite as a portion of the fly-ash component, a weight of the wollastonite being between 1% and 7.5% of the total weight, and wherein said wollastonite made up of at least one grade of powder-type wollastonite and at least one grade of anisotropic-type wollastonite particles.

An embodiment such as the foregoing may be more precisely specified as a weight of the stone is between 45 and 50% of the total weight; a weight of the sand is between 30 and 35% of the total weight; a weight of the Portland cement is between 10 and 12% of the total weight; a weight of the fly ash is between 5 and 8% of the total weight; a weight of the mineral fibers is between 1 and 2% of the total weight; and a weight of the wollastonite is between 1% and 5% of the total weight.

An embodiment such as the foregoing may be more precisely specified as a weight of the stone is about 48.24% of the total weight; a weight of the sand is about 33.15% of the total weight; a weight of the Portland cement is about 10.32% of the total weight; a weight of the fly ash is about 6.88% of the total weight; a weight of the mineral fibers is about 1.41% of the total weight; and a weight of the wollastonite is about 1.46% of the total weight.

An embodiment such as one of the foregoing may be further characterized in that the mineral fibers comprise multiple grades of mineral fibers.

An embodiment such as one of the foregoing may be further characterized in that the mineral fibers comprise multiple lengths of the mineral fibers.

An embodiment such as one of the foregoing may be further characterized in that the mineral fibers comprise multiple thicknesses of the mineral fibers.

An embodiment such as one of the foregoing may be further characterized to require that the powder-type wollastonite is substantially all smaller than U.S. 20 mesh size.

An embodiment such as one of the foregoing may be further characterized to require that the powder-type wollastonite is substantially all smaller than U.S. 40 mesh size.

An embodiment such as one of the foregoing may be further characterized to require that approximately 57% of the powder-type wollastonite is smaller than U.S. 100 mesh size.

An embodiment such as one of the foregoing may be further characterized to require that the anisotropic-type wollastonite particles are substantially all smaller than U.S. 10 mesh size.

An embodiment such as one of the foregoing may be further characterized to require that the anisotropic-type wollastonite particles are mostly smaller than U.S. 20 mesh size.

An embodiment such as one of the foregoing may be further characterized to require that the anisotropic-type wollastonite particles show a significant decline between U.S. 20 mesh size and U.S. 40 mesh size.

An embodiment such as one of the foregoing may be further characterized to require that less than 5% of the anisotropic-type wollastonite particles are smaller than U.S. mesh size 60.

Another embodiment of the invention is a method of constructing a structure to meet an applicable industry codes & standards, the method comprising placing a concrete form having a cavity in a location where a structure is to be constructed; placing a limited quantity of metal reinforcement within the cavity, such that the limited quantity of metal reinforcement is insufficient to meet the applicable building code; mixing a dry cementitious mixture according to one of the foregoing embodiments with water to produce a hydraulic cement mixture; pouring the hydraulic cement mixture into the cavity; and allowing the hydraulic cement mixture to cure with the limited quantity of metal reinforcement embedded therein, said cured mixture with limited metal reinforcement embedded therein thereby meeting the applicable building code without additional metal reinforcement.

Another embodiment of the invention is a method of stabilizing a volume of soil, comprising: tilling a dry cementitious mixture according to one of the foregoing compositions into a volume of soil to be stabilized; and adding a sufficient volume of water to the volume of soil so that the dry cementitious mixture is activated.

I claim:

1. A dry cementitious mixture comprising:
   stone, sand, Portland cement, fly ash and mineral fibers mixed together to produce a dry cementitious mixture having roughly uniform ingredient distribution and a total weight, wherein
   a weight of the stone is between 40 and 50% of the total weight;
   a weight of the sand is between 30 and 40% of the total weight;
   a weight of the Portland cement is between 10 and 15% of the total weight;
   a weight of the fly ash is between 5 and 10% of the total weight; and
   a weight of the mineral fibers is between 0.5 and 2% of the total weight, the mixture further comprising:
   wollastonite as a portion of the fly-ash component, a weight of the wollastonite being between 1% and 7.5% of the total weight, and wherein
   said wollastonite made up of at least one grade of powder wollastonite and at least one grade of anisotropic wollastonite particles.

2. The dry cementitious mixture of claim 1, wherein:
   a weight of the stone is between 45 and 50% of the total weight;
   a weight of the sand is between 30 and 35% of the total weight;
   a weight of the Portland cement is between 10 and 12% of the total weight;
   a weight of the fly ash is between 5 and 8% of the total weight;
   a weight of the mineral fibers is between 1 and 2% of the total weight; and
   a weight of the wollastonite is between 1% and 5% of the total weight.

3. The dry cementitious mixture of claim 1, wherein:
   a weight of the stone is about 48.24% of the total weight;
   a weight of the sand is about 33.15% of the total weight;
   a weight of the Portland cement is about 10.32% of the total weight;
   a weight of the fly ash is about 6.88% of the total weight;
   a weight of the mineral fibers is about 1.41% of the total weight; and
   a weight of the wollastonite is about 1.46% of the total weight.

4. The dry cementitious mixture of claim 1, wherein the mineral fibers comprise multiple grades of mineral fibers.

5. The dry cementitious mixture of claim 1, wherein the mineral fibers comprise multiple lengths of the mineral fibers.

6. The dry cementitious mixture of claim 1, wherein the mineral fibers comprise multiple thicknesses of the mineral fibers.

7. The dry cementitious mixture of claim 1, wherein the powder wollastonite is smaller than U.S. 20 mesh size.

8. The dry cementitious mixture of claim 1, wherein the powder wollastonite is smaller than U.S. 40 mesh size.

9. The dry cementitious mixture of claim 1, wherein approximately 57% of the powder wollastonite is smaller than U.S. 100 mesh size.

10. The dry cementitious mixture of claim 1, wherein the anisotropic wollastonite particles are smaller than U.S. 10 mesh size.

11. The dry cementitious mixture of claim 1, wherein the anisotropic wollastonite particles are smaller than U.S. 20 mesh size.

12. The dry cementitious mixture of claim 1, wherein the anisotropic wollastonite particles show a substantial decline between U.S. 20 mesh size and U.S. 40 mesh size.

13. The dry cementitious mixture of claim 1, wherein less than 5% of the anisotropic wollastonite particles are smaller than U.S. mesh size 60.

14. A method of constructing a structure to meet an applicable industry codes & standards, the method comprising:
- placing a concrete form having a cavity in a location where a structure is to be constructed;
- placing a limited quantity of metal reinforcement within the cavity, such that the limited quantity of metal reinforcement is insufficient to meet the applicable building code;
- mixing a dry cementitious mixture according to claim 1 with water to produce a hydraulic cement mixture;
- pouring the hydraulic cement mixture into the cavity; and
- allowing the hydraulic cement mixture to cure with the limited quantity of metal reinforcement embedded therein, said cured mixture with limited metal reinforcement embedded therein thereby meeting the applicable building code without additional metal reinforcement.

15. A method of stabilizing a volume of soil, comprising:
- tilling a dry cementitious mixture according to claim 1 into a volume of soil to be stabilized; and
- adding a sufficient volume of water to the volume of soil so that the dry cementitious mixture is activated.

* * * * *